US009848033B2

(12) United States Patent
Goel et al.

(10) Patent No.: US 9,848,033 B2
(45) Date of Patent: Dec. 19, 2017

(54) SYSTEM AND METHOD FOR PROACTIVELY SENDING HOSTED CONTENT ITEMS TO USER COMPUTING DEVICES

(71) Applicant: Dropbox, Inc., San Francisco, CA (US)

(72) Inventors: Samir Goel, San Francisco, CA (US); Franck Chastagnol, Woodside, CA (US); Abhishek Agrawal, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 239 days.

(21) Appl. No.: 14/609,919

(22) Filed: Jan. 30, 2015

(65) Prior Publication Data
US 2016/0226950 A1  Aug. 4, 2016

(51) Int. Cl.
*G06F 15/173* (2006.01)
*H04L 29/08* (2006.01)
*G06F 17/30* (2006.01)

(52) U.S. Cl.
CPC ........ *H04L 67/06* (2013.01); *G06F 17/30174* (2013.01); *G06F 17/30575* (2013.01); *H04L 67/1095* (2013.01); *H04L 67/1097* (2013.01)

(58) Field of Classification Search
CPC ........... H04L 67/1095; G06F 17/30575; G06F 17/30174
USPC ................................................. 709/248, 217
See application file for complete search history.

(56) References Cited

U.S. PATENT DOCUMENTS

| 8,065,292 | B2 * | 11/2011 | Yu ..................... G06F 17/30864 370/230 |
| 8,612,470 | B1 * | 12/2013 | Fushman .......... G06F 17/30867 707/749 |
| 8,819,798 | B2 * | 8/2014 | Zises ..................... G06F 21/32 726/7 |
| 9,419,969 | B2 * | 8/2016 | Polo Moragon .... H04L 63/0853 |
| 9,661,102 | B2 * | 5/2017 | Lee ........................ H04L 67/325 |
| 2003/0028639 | A1 * | 2/2003 | Yamamoto .......... H04L 63/0442 709/225 |

(Continued)

OTHER PUBLICATIONS

U.S. Appl. No. 14/609,937, filed Jan. 30, 2015.
U.S. Appl. No. 14/609,930, filed Jan. 30, 2015.

*Primary Examiner* — Hieu Hoang
(74) *Attorney, Agent, or Firm* — Hickman Palermo Becker Bingham LLP; Adam C. Stone

(57) ABSTRACT

A system and method for proactively sending hosted content items to user computing devices. In one implementation, an online content management system collects access event data representing a plurality of access events pertaining to a plurality of hosted content items. The system determines a cross-device access signal for a first hosted content item. The system then detects a first access event pertaining to the first hosted content item. Thereafter, the system determines whether the first access event matches the cross-device access signal. If the first access event matches the cross-device access signal, then the system sends a second hosted content item to a user computing device. The second hosted content item can be the first hosted content item. Alternatively, the second hosted content item can be a content item that is related to the first hosted content item according to the access event data.

16 Claims, 4 Drawing Sheets

(56) References Cited

U.S. PATENT DOCUMENTS

| | | | |
|---|---|---|---|
| 2007/0168429 A1* | 7/2007 | Apfel | H04L 67/2814 709/206 |
| 2010/0274859 A1* | 10/2010 | Bucuk | H04L 63/08 709/206 |
| 2011/0313972 A1* | 12/2011 | Albouze | G06F 17/30575 707/624 |
| 2016/0072865 A1* | 3/2016 | Kaplinger | H04L 67/06 709/213 |

* cited by examiner

SYSTEM AND METHOD FOR PROACTIVELY SENDING HOSTED CONTENT ITEMS TO USER COMPUTING DEVICES

TECHNICAL FIELD

The present invention relates generally to managing hosted content items and, more specifically, to a system and method for proactively sending hosted content items to user computing devices.

BACKGROUND

Traditionally, computer users have stored personal digital information at their personal computing devices. For example, after editing a word processing or spreadsheet document using a personal computer, the user saves the document to the computer's hard drive. In recent years, however, the cost of personal computing devices has lowered to the point where a user can own multiple personal computing devices and store personal digital information at each of them. For example, a user may own a laptop computer that stores the user's work documents and a mobile phone that stores the user's digital photos. In some cases, a user may store personal digital information at a personal computer the user does not own but nonetheless uses regularly or periodically, such as a school or work computer.

Today, many users "host" their personal digital information with online content management services. Such services typically allow users to upload their personal digital information for storage at service-operated server computers accessible on the Internet or other communications network. One well-known online content management service is the DROPBOX file hosting service provided by Dropbox, Inc. of San Francisco, Calif. Hosting personal digital information with online content management services provides a number of benefits to users. For example, such services typically allow users to back up, share, synchronize, access and store their hosted digital information.

Although the wide-availability of the broadband Internet connectivity has made it possible for users to use their personal computing device to remotely access personal digital information hosted with online content management services, there are still situations in which users would prefer to store copies of their hosted personal digital information at their personal computing devices for the purpose of facilitating "local" access to the information. For example, a user may wish to store a word processing document on a storage device (e.g., a hard disk) of a laptop computer to have access to the document when using the laptop computer on an airplane or in another location where Internet connectivity is unavailable or difficult or inconvenient to obtain.

There are various different approaches that online content management services could adopt for storing hosted personal digital information at user computing devices for the purpose of facilitating local access to the information. For example, in one possible approach, a copy of all or most of a user's hosted personal digital information is stored at the user's computing device. However, this approach may not be practical if the user's computing device has limited storage capacity. For example, the user may host hundreds of gigabytes (GB) of personal digital information with an online content management service and regularly use a mobile phone that has only thirty-two gigabytes (32 GB) of hard disk storage capacity. In this case, even with data compression, it may not be possible to store a copy of all or most of the user's hosted personal digital information at the user's mobile phone.

In another possible approach, only a copy of the most recently accessed hosted information is cached at a user's computing device. According to this approach, when a user accesses hosted digital information from the user's computing device, the information is downloaded from the online content management service to the user's computing device and stored there (e.g., on a hard drive of the user's computing device) for some period of time. Less recently accessed information may be deleted from the user's computing device to make room at the user's computing device for more recently accessed information. However, this approach can be ineffective or inconvenient for the user if the user attempts to access hosted information that is not already cached at the user's computing device. For example, upon attempting to access a hosted document, the user may be required to wait for the document to be downloaded from the online content management service over the Internet to the user's computing device before the user can view or edit the document, which the user may find tedious and time consuming, especially if the user's computing device is connected to the Internet via a relatively low bandwidth or high latency data network, such as, for example, a cellular telephone network.

Given the increasing digitization of the world's information, user demand for hosting personal digital information with online content management services can only be expected to increase. This trend is coupled with a need of users to be able to more easily access hosted digital information locally at the users' personal computing devices. The present invention fulfills this and other needs.

SUMMARY OF THE DISCLOSURE

According to one aspect, the present invention encompasses a method for proactively sending a content item hosted by an online content management system to a user computing device. The method comprises the steps, performed by one or more computing devices of the online content management system, of: collecting, by at least one of the computing devices, access event data representing a plurality of access events pertaining to a plurality of hosted content items; determining, by at least one the computing devices, based on the access event data, a cross-device access signal; detecting, by at least one of the computing devices, a first access event pertaining to a first content item of the plurality of hosted content items; determining, by at least one the computing devices, that the first access event matches the cross-device access signal; and based on the first access event matching the cross-device access signal, sending, by at least one of the computing devices, a second content item, of the plurality of hosted content items, to a user computing device. The second content item can be the first content item or a content item of the plurality of hosted content items that is related to the first content item according to the access event data.

According to another aspect, the present invention encompasses a system with one or more hardware processors configured to perform the foregoing method.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
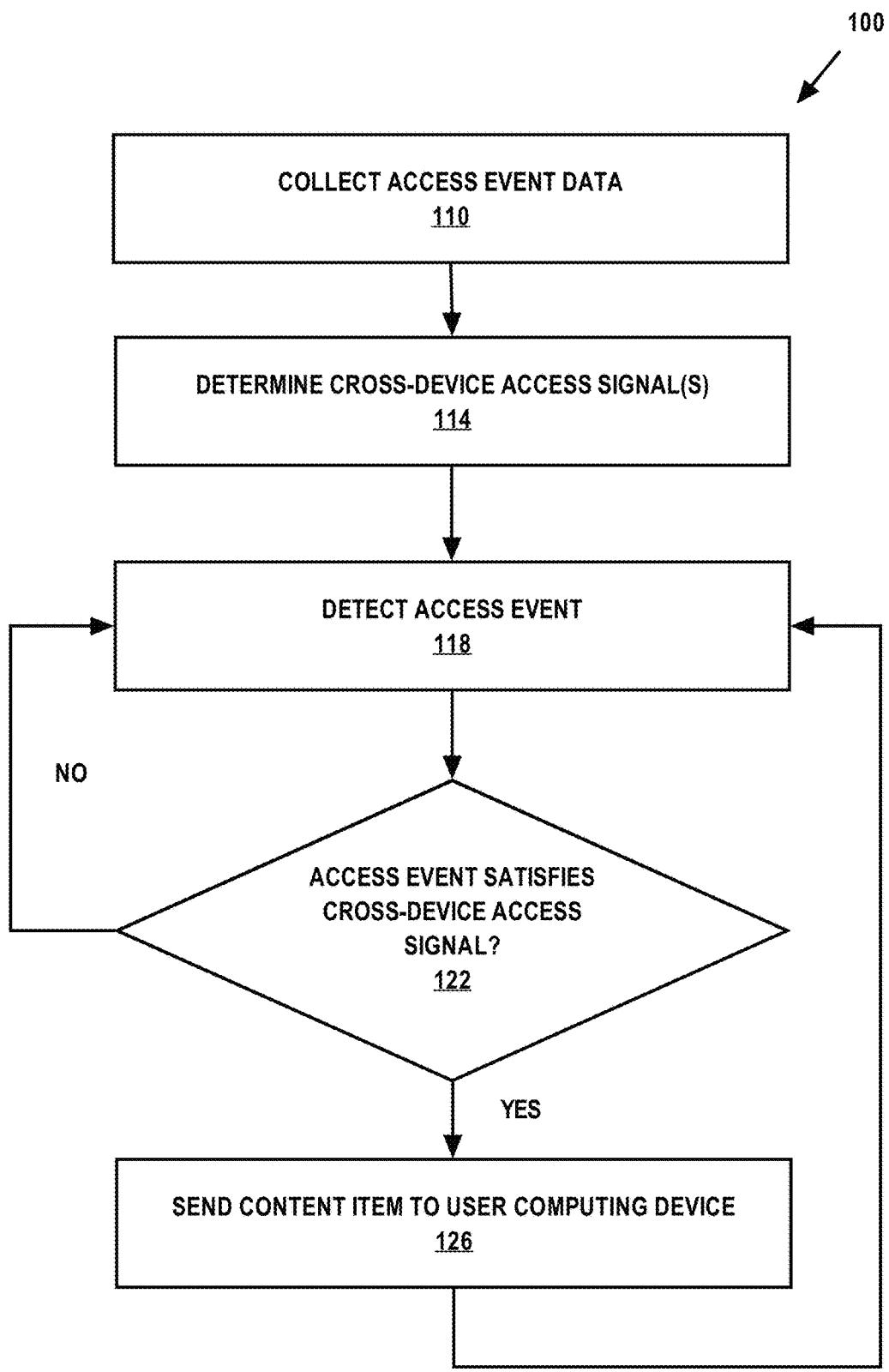
FIG. 1 is a flow diagram of a computer-implemented technique for proactively sending hosted content items to user computing devices, according to an embodiment of the present invention.

A system and method for proactively sending hosted content items to user computing devices is described. In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

Overview

A system and method for proactively sending a hosted content item to a user computing device generally involves collecting access event data reflecting a plurality of access events pertaining to a plurality of content items hosted by an online content management system. Cross-device access signals are determined for hosted content items based on the access event data. When an access event pertaining to a hosted content item is detected, a determination is made whether the access event satisfies a cross-device access signal. If it does, then a content item of the plurality of hosted content items is sent to a user computing device. The content item sent to the user computing device may be the same content item to which the detected access event pertains. Alternatively, the content item sent to the user computing device may be a content item that, according to the access event data, is related to the content item to which the detected access event pertain.

Content Items

The online content management system may host users' content items. A "content item" may be defined as a collection of digital information. Some non-limiting examples of a content item include, but are not limited to, a word processing document, a spreadsheet document, a digital image, and other types of files, documents, and digital media.

A content item may correspond to a standardized or conventional file type such that the content of the content item conforms to a standardized or conventional data format associated with that file type. Some standardized and conventional file types to which a content item may correspond to include, but are not limited to, image file types (e.g., .jpg, .tiff, .gif), music file types (e.g., .mp3, .aiff, .m4a. wav), movie file types (e.g., .mov, .mp4, .m4v), word processing file types (e.g., .doc, .docx, .pages), presentation file types (e.g., .ppt, .pptx, .key), spreadsheet file types (e.g., .xls., .xlsx, .numbers), web page file types (e.g., .htm, .html), and text file types (e.g., .txt). While in some instances a content item corresponds to a standardized or conventional file type, a content item corresponds to a proprietary or unknown file type in other instances.

The above discussion provides just some examples of possible types of content items that may be among a user's content items hosted with the online content management system. A user may host all of these types of content items with the online content management system, or a subset or a superset thereof.

Example Process

FIG. 1 is a flow diagram of a method for proactively sending a hosted content item to a user computing device, according to an embodiment of the present invention. As to the flow diagram, each block within the flow diagram represents both a method step and an apparatus element for performing the method step. Depending upon the implementation, the corresponding apparatus element may be configured in hardware, software, firmware, or combinations thereof.

Access Event Data

In block 110, access event data reflecting access events pertaining to content items hosted by the online content management system is collected. For example, an access event pertaining to a hosted content item may include opening the content item at a user computing device, downloading the content item from the online content management system to a user computing device, viewing the content item at a user computing device, modifying the content item at a user computing device, and sharing the content item using a user computing device. For example, the access event data reflecting the access event may specify all of the following access event attributes, or a subset or a superset thereof:

- A content item identifier identifying the hosted content item that was accessed. For example, the content item identifier may be an N-bit (e.g., 64-bit) value that uniquely identified the hosted content item.
- A content item namespace identifier identifying the "content item namespace" to which the hosted content item identified by the content item identifier belongs to. Content item namespaces are described in greater detail below.
- A content item path identifying a relative or absolute path from a root content item folder to the hosted content item in a content item folder hierarchy. For example, the content item path "/video.avi" specifies that the hosted content item is named "video.avi" and is stored in the root content item folder "/" in the content item folder hierarchy.
- A user identifier identifying the user, or an account of the user, that accessed the hosted content item. For example, the user identifier may be an e-mail address of the user, an N-bit (e.g., 64-bit) value, or other value that uniquely identifies the user or an account of the user.
- A device identifier identifying a user computing device at which the access event occurred. For example, the device identifier may be an N-bit (e.g., 64-bit) value that uniquely identified the user computing device.

A date/time timestamp identifying when the access event occurred. For example, the date/time timestamp may be a counter or clock value specifying when the access event occurred.

An access type identifier identifying the type of access that occurred. For example, the access type identifier may be one value in an enumeration of values that uniquely identifies the access type that occurred among all possible access types encompassed by the enumeration of values.

Access event data reflecting a single access event is sometimes referred to herein as an "access event data item." As indicated above, an access event data item may include an access type identifier that identifies the type of access that occurred during the access event. According to some embodiments, the access type identifier identifies one of the following types of access:

Open—The content item identified by the content item identifier of the access event data item was opened at the user computing device identified by the device identifier of the access event data item.

Download—The content item was downloaded from the online content management system to the user computing device.

View—The content item was viewed at the user computing device.

Modify—The content item was modified at the user computing device.

Share—The content item was shared with one or more users from the user computing device.

In addition to the above-listed access types, an access type identifier can identify other types of access events. For example, an access type identifier may identify a "commented on" access event in which the user provide text-based comments about the content item. As another example, an access type identifier may identify a "favorite" access event in which the user marked or otherwise designated the content item as a favorite (e.g., by activating a star or favorites icon associated with the content item in a graphical user interface). More generally, an access type identifier can identify any type of access event involving a content item which indicates whether the content item is important to the user and should be available locally at the user's computing device.

Opening a hosted content item at a user computing device may involve opening a local copy of the hosted content item stored at the user computing device. The local copy may be stored on a hard disk or other storage device of the user computing device, for example. For example, opening a hosted word processing document at a user computing device may involve a word processing application executing on the user computing device opening a local copy of the word processing document stored at the user computing device.

Downloading a hosted content item from the online content management system to a user computing device may involve the user computing device establishing a network connection with the online content management system and receiving data of the content item from the online content management system over the network connection. For example, the network connection may be a TCP/IP based connection in which the HTTP or HTTPS protocol is used to negotiate downloading the data of the content item from the online content management system to the user computing device.

Viewing a hosted content item at a user computing device may involve an application, such as, for example, a web browser application or a mobile application, executing on the user computing device presenting a portion or all of the content item in a graphical user interface of the user computing device. For example, viewing a hosted word processing document at the user computing device may involve presenting the first page of the word processing document in web browser window. Viewing a hosted content item may also involve downloading the hosted content item and/or opening the hosted content item.

Modifying a hosted content item at a user computing device may involve modifying a local copy of the hosted content item stored at the user computing device. For example, modifying a hosted word processing document at a user computing device may involve a word processing application executing on the user computing device modifying a local copy of the word processing document stored at the user computing device.

Sharing a hosted content item from a user computing device may involve an application, such as, for example, a web browser application or a mobile application, executing on the user computing device establishing a network connection with the online content management system and sending data over the network connection to the online content management system requesting the online content management system to share the hosted content item. There are at least two ways in which a hosted content item can be shared. In one way, the online content management system generates a unique link (e.g., a Uniform Resource Locator) to the hosted content item. The unique link can be used at a user computing device in conjunction with a web browser application executing on the user computing device to obtain a web page from the online content management system that presents the hosted content item (or a portion or a preview thereof) in the web page. In some cases, the unique link can also be used with the web browser to download the hosted content item to the user computing device. In a second way, the hosted content item is shared as part of a content item folder in which it is contained, either directly or indirectly in the content item folder hierarchy. In this case, the request from the user computing device to share may specify the content item folder to share and one or more users to share the content item folder with. Once shared, the user sharing the content item folder and the one or more specified users all have access to the content item folder and its contents including any hosted content items directly or indirectly in the content item folder in the content item folder hierarchy. Here, indirectly refers to the possibility that a hosted content item may be contained directly in a content item folder that is contained directly or indirectly in the shared content item folder in the content item folder hierarchy.

When an access event pertaining to a hosted content item occurs, a user computing device and/or the online content management system may generate an access event data item that represents the access event. For example, when a local copy of a hosted content item is opened by an application executing on a user computing device, the user computing device may generate an access event data item representing an Open access event. As another example, when a user computing device sends a request to the online content management system to download a hosted content item to the user computing device, the online content management system may generate an access event data item representing a Download access event. As yet another example, when a web browser application executing on a user computing device sends a request to the online content management system to download data of a hosted content item to the user computing device for the purpose of presenting at least a portion of the hosted content item in a web browser graphical user interface window at the user computing device, the online content management system may generate an access event data item representing a View access event. As still yet another example, when a local copy of a hosted content item is modified by an application executing on a user computing device, the user computing device may generate an access event data item representing a Modify access event. As still yet another example, when a web browser application executing on a user computing device sends a request to the online content management system to share a hosted content item or a content item folder, the online content management system may generate an access event data item representing a Share access event.

While in some implementations the user computing devices generate access event data items for the Open and Modify access events, the online content management system generates access event data items for the these types of access events in other implementations. For example, the online content management system may detect the occurrence of these types of access events as part of a content item synchronization process implemented by the user computing devices and the online content management system as described in greater detail below.

The online content management system may collect access event data items that it generates in response to detecting the occurrence of access events. In addition, if access event data items are generated at user computing devices, the online content management system may collect access event data items from the user computing devices. For example, the user computing devices may maintain a local log for storing generated access event data items generated in response to detecting occurrence of access events at the user computing devices. The user computing devices may then periodically or opportunistically send access event data items stored in the local log over a network connection to the online content management system.

In some implementations, access event data is collected for a sample time period. For example, access event data may be collected for hosted content items for a period spanning a number of hours, days, weeks, months, or other time period suitable for the requirements of the particular implementation at hand.

In some implementations, access event data is collected on a per-user basis. For example, access event data may be collected for all of a user's content items hosted with the online content management system.

In some implementations, access event data is collected on a per-content item namespace basis. Content item namespaces are described in greater detail below. However, generally, a content item namespace is a named collection or grouping of hosted content items. For example, a content item namespace may include hosted content items associated with a user's account held with the online content management system. As another example, a content item namespace may include a set of hosted content items shared among a group of users.

Once access event data has been collected it may be analyzed to determine one or more cross-device access signals.

Cross-Device Access Signals

In block 114, one or more cross-device access signals are determined based on the access event data collected in block 110. A cross-device access signal is data that represents a hosted content item or a set of related hosted content items that, according to the access event data, is accessed at more than one user computing device. For example, the access event data may indicate that a user accessed a word processing document at a laptop computer at a first time and then, an hour after the first time, accessed the word processing document at the user's mobile phone. In this example, a cross-device access signal may be determined for the word processing document. As another example, the access event data may indicate that a user accessed multiple hosted content items in the same content item folder at multiple user computing devices. In this example, a cross-device access signal may be determined for the content item folder. Alternatively, a cross-device access signal may be determined for each of the individually accessed hosted content items accessed in the content item folder.

Determining a cross-device access signal for a hosted content item may involve analyzing the access event data to identify a hosted content item that has been accessed at more than one user computing device. For example, the access event data may contain multiple access event data items with the same content item identifier but different device identifiers. The presence of such access event data items indicates that the content item identified by the content item identifier is accessed at multiple computing devices. Accordingly, a cross-device access signal may be determined for the content item.

Determining a cross-device access signal for a set of related hosted content items may involve analyzing the access event data to determine if there is a content item folder for which multiple content items contained directly in the content item folder are each accessed at more than one computing device. For example, the access event data may contain multiple access event data items with different content item identifiers, different device identifiers, but with a common content item path prefix. The presence of such access event data items indicates a content item folder containing content items that are accessed at multiple computing devices. Accordingly, a cross-device access signal may be determined for the content item folder.

In some implementations, a cross-device access signal identifies a hosted content item or a content item folder to which it pertains. For example, a cross-device access signal may identified a hosted content item by a content item identifier, or identify a content item folder by the content item path to the content item folder in the content item folder hierarchy.

A cross-device access signal may be associated with data identifying one or more users that, according to the access event data, were involved in accessing the hosted content item or the set of related hosted content items. For example, the data may include the user identifiers of the one or more users.

In addition to or as an alternative to the data identifying the one or more users, the cross-device access signal may be associated with data identifying one or more user computing devices that, according to the access event data, were involved in accessing the hosted content item or the set of related hosted content items. For example, the data may include the device identifiers of the one or more user computing devices.

In some implementations, cross-device access signals are maintained on a per-user basis depending on whether access event data is collected on a per-user basis or a per-content item namespace basis. In other implementations, cross-device access signals are maintained on a per-content item namespace basis depending on whether access event data is collected on a per-user basis or a per-content item namespace basis.

Once cross-device access signals have been determined based on the access event data, hosted content items can be proactively sent to user computing devices based on detecting access events that satisfy a cross-device access signal. The existence of an access event that satisfies a cross-device access signal indicates that the content item involved in the access event may be accessed at multiple user computing devices.

Proactively Sending Hosted Content Items

In block 118, an access event involving one of the hosted content items for which access event data was collected in block 110 is detected. Detection of the access event may occur in the same manner that access events are detected for the purpose of collecting access event data as in block 110 above. In particular, an access event data item may be generated by the online content management system, or collected from a user computing device by the online content management system, for the detected access event. The access event data item may identify the hosted content item involved in the access event and the path in the content item hierarchy to the content item involved in the access event.

In block 122, it is determined whether the detected access event satisfies one or more of the cross-device access signals determined in block 114. The detected access event can satisfy a cross-device access signal in at least one of two ways. In a first way, the detected access event satisfies the cross-device access signal if the content item involved in the detected access event is the same content item for which the cross-device access signal was determined, if the cross-device access signal was determined for the hosted content item. In a second way, the detected access event satisfies the cross-device access signal if the content item involved in the detected access event is directly contained in the same content item folder for which the cross-device access signal was determined, if the cross-device access signal was determined for the content item folder.

If, in block 122, the detected access event does not satisfy any of the cross-device access signals determined in block 114, then the process may return to block 118 to wait for detection of the next access event. However, if, in block 122, the detected access event does satisfy a cross-device access signal, then, in block 126, the content item involved in the detected access event may be sent to one or more user computing devices associated with the cross-device access signal. In one implementation, the content item involved in the detected access event is sent to all user computing devices associated with the cross-device access signal except the user computing device at which the detected access event occurred.

After sending the content item involved in the detected access event to user computing devices associated with the cross-device access signal, the process may return to block 118 to wait for detection of the next access event.

In some implementations, steps 110 and 114 are repeated periodically (e.g., one a day, once a week) with some or all of the current access event data and the current cross-device access signals being discarded. By doing so, cross-device access signals are determined based on recent access events, which may be more indicative of the current cross-device access patterns of hosted content items.

Network Environment

Various embodiments of the present invention operate in accordance one or more sets of computer-executable instructions configured to perform various functions as described herein when executed by one or more computing devices, such as, for example, a user computing device and/or one or more computing devices of an online content management system that are coupled together on a communications network, such as, for example, the Internet, a mobile telephone network or a wide area network.

Figure 2:
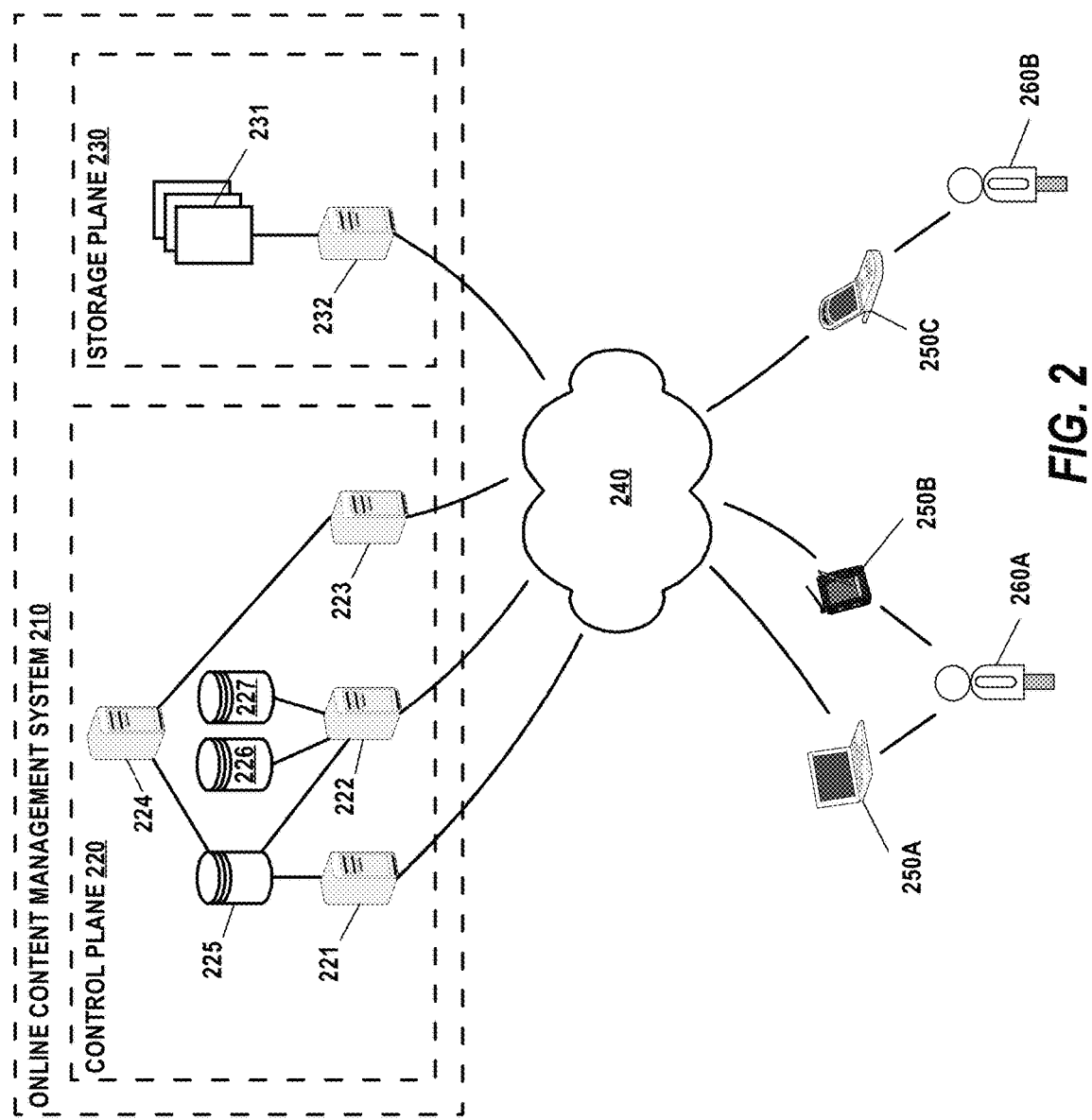
FIG. 2 is a block diagram of a network environment containing an online content management system for proactively sending hosted content items to user computing devices, according to an embodiment of the present invention.

Turning now to FIG. 2, it is a block diagram of a network environment 200 in which embodiments of the invention for proactively sending hosted content item to user computing devices may be employed. In the network environment 200, an online content management system 210 is operated by an online content management service and operates on a communications network 240, such as the Internet. The online content management system 210 includes a control plane 220 and a storage plane 230. The control plane 220 includes an access event collector computer 221, a metadata computer 222, a notification computer 223, a proactive synchronizer computer 224, an access event log 225, a user account data store 226, and a content item synchronization log 227. The storage plane 230 includes hosted content items 231 and content item server computer 232.

As used in this description and in the appended claims, the singular form of "computer" is intended to include the plural form as well, unless the context clearly indicates otherwise. For example, where a function, feature, or step of an embodiment of the invention is described herein as implemented by a single computer, that function, feature, or step may be in other embodiments implemented by multiple computers, for example, arranged in a computing cluster or in a distributed computing environment, unless the context clearly indicates otherwise. Further, functions, features or steps described herein in some embodiments as being performed by different computers may instead in other embodiments be performed by the same computer.

The access event collector computer 221, the metadata computer 222, the notification computer 224, and the content item server computer 232 may be coupled to one or more user computing devices (e.g., 250A, 250B, 250C) by the communications network 240. The communications network 240 may include a public network, such as the Internet, a mobile telephone network, a local area network, or any other suitable communications network, wired, wireless, or a hybrid thereof.

The user computing devices (e.g., 250A, 250B, 250C), referred to generally herein as "user computing device 250," may be used by a human user (e.g., 260A), referred to generally as "user 260." A user computing device 250 may be any conventional personal computer or personal computing device with wired and/or wireless network communications capabilities such as, for example, a desktop computer, workstation computer, laptop computer, mobile phone, cell phone, smart phone, set-top device, in-vehicle computer, personal digital assistant, or other personal computer or personal computing device with wired and/or wireless network communications capabilities.

The online content management service, which in an exemplary embodiment is the DROPBOX file hosting service provided by Dropbox, Inc. of San Francisco, Calif., may store (host) users' 260 content items 231 on computers of the online content management system 210. The computers on which users' 260 content items 231 are stored may be part of the storage plane 230, which in an exemplary embodiment is provided as part of the AMAZON S3 online file hosting web service provided by Amazon.com of Seattle, Wash. In this arrangement, while the online content management service may not necessarily own the computers in the storage plane 230, including the computers on which the content items 231 are stored and the content item server computer 332, the computers of the storage plane 230 that the online content management service controls or manages may be considered part of the online content management system 210. Such management or control may be evident by software developed by the online content management service installed and executing on the computers and/or content items 231 managed by the online content manage service stored (hosted) on the computers.

Features of the online content management system 210 may be provided by the online content management service to a user 260 according a variety of different monetary fee arrangements including, but not limited to, for free up to a certain amount of storage space of the storage plane 230 consumed by the user's 260 hosted content items 231, for a monthly, yearly, or other periodic service fee charged to the user 260, possibly based on the amount of storage space of the storage plane 230 consumed by the user's 260 hosted content items 231 during the period, among other possible fee arrangements.

Content Item Synchronization

One feature provided to users 260 by the online content management system 210 may be content item synchronization. In particular, a user's 260 hosted content items 231 may be synchronized with content items stored at the user's computing devices (e.g., 250A, 250B). Generally, synchronization may involve a change to a content item at one of the user's 260 computing devices 250 being sent over the communications network 240 to the content item server computer 232. The change may be sent over the communications network 240 as one or more data blocks, each of the data blocks containing a portion of the content item. Upon receiving the change from the user computing device 250, the change is used by the content item server computer 232 to either create a corresponding content item 231 in the storage plane 230 or is applied to the corresponding content item 231 in the storage plane 230, thereby synchronizing the changed content item at the user computing device 250 with the corresponding content item 231 in the storage plane 230.

Synchronization may be bi-directional. For example, a user 260 may store content items at more than one user computer. For example, the user 260A may store content items on a laptop computer 250A and also store content items on a mobile phone 250B. In this case, a change to a content item at the user's 260A laptop computer 250A may be sent to the online content management system 210 for application a corresponding content item 231 in the storage plane 230. In addition, the change may also be sent from the online content management system 210 to the user's 260A mobile phone 250B for application to a corresponding content item stored at the user's 260A mobile phone 250B. After this bi-directional synchronization operation, the content item at the user's 260A laptop computer 250A, the corresponding content item in the storage plane 231, and the corresponding content item at the user's 260A mobile phone 250B may be identical.

A change to a content item sent from a user computer 250 to the online content management system 210 may be caused by various different events occurring at the user computer 250. For example, the content item may be have been recently modified, created, or deleted at the user computer 250. To facilitate the synchronization process, the user computer 250 may be configured with a synchronization application which may be implemented, for example, as a software program or set of computer-executable instructions.

The synchronization application at a user computer 250 may be configured to perform various synchronization operations on content items including, but not limited to, detecting changes to content items at the user computer 250, sending detected content item changes to the online content management system 210 over the communications network 240, receiving content item changes from the online content management system 210 over the communications network 240, and applying received content item changes to content items at the user computer 250.

In some cases, one or more of a user's 260 hosted content items 231 may be shared with one or more other users of the online content management system 210. For example, the user 260 may belong a team of users that collaborate and share content items through the online content management system 210. In this case, changes to content items at one of the team member's 260 user computers 250 may be synchronized with corresponding content items 231 in the storage plane 230 and also corresponding content items at the other team members' 260 user computers 250.

Thus, either because of content item synchronization, a user's 260 hosted content items 231 may change from time to time.

Selective Synchronization

In some implementations, one or more of a user's 260 hosted content items 231 are not synchronized with (stored at) a particular one of the user's 260 user computers 250. In other words, the user's 260 hosted content items 231 are selectively synchronized with the particular user computer 250. For example, the user 260A may configure the synchronization application at the user's 260A mobile phone 250B to not synchronize the user's 260A hosted digital photos 231 with the mobile phone 250B but synchronize all other of the user's 260A hosted content items 231 with the mobile phone 250B. The user 260A may configure the synchronization application in this way, for example, to conserve data storage space at the mobile phone 250B or for other reasons.

As another example, the synchronization application at the mobile phone 250B may be configured to automatically determine which of the user's 260A hosted content items 231 to synchronize with the mobile phone 250B. For example, the synchronization application may be configured to treat the mobile phone 250B as a local cache of some of the user's 260A hosted content items 231 in which the user's 260A hosted content item 231 that were most recently accessed and/or that are most likely to be accessed in the future are synchronized with (cached at) the mobile phone 250A. Such treatment may involve techniques disclosed herein for proactively sending hosted content items to user computing devices.

Thus, because of selective synchronization, a user's 260 user computer 250 may store at a given time only a subset of the user's 260 content items 231 hosted with the online content management service 210.

User Accounts

The storage plane 230 may store content items 231 for multiple users 260 (e.g., millions of users or more). The set of content items 231 among all content items 231 stored in the storage plane 230 that belong to a particular user (e.g., 260B) may be established by a user account that the user maintains with the online content management service 210. For example, user 260B may hold a user account with the online content management system 210 and the user's 260B hosted content items 231 may be associated with the user account. In this way, the online content management service 210 can determine which of the content items 231 in the storage plane 230 are the user's 260B content items 231. As part of this determination, the online content management system 110 may authenticate the user 260B with valid authentication credentials (e.g., a valid username/password pair) provided by the user computer 250B to identify the user's 260B user account in the user account data store 226. Once identified, the online content management system 210 can authorize (e.g., allow or deny) requests from the user computer 250B (e.g., the synchronization application on the user computer 250B) to access (e.g., read or write) content items 231 in the storage plane 230 identified in the requests based on whether the identified content items 231 are associated with user's 260B user account.

An association between a user's 260 user account and one of the user's 260 hosted content items 231 in the storage plane 230 may be established by way of a unique identifier of the content item 231. For example, the content item identifier may include a unique 64-bit value that uniquely identifies the content item 231. However, the content item identifier may be represented with fewer or more bits according to the requirements of the particular implementation at hand.

Content Item Namespaces

A user's 260 hosted content items 231 may be organized into one or more "content item namespaces." A content item namespace may be defined as a collection of one or more content items 231 under common access control. The common access control can be based on explicit and/or implicit permissions specifying and/or indicating which user(s) and/ or group(s) of users have access to the content items 231 in the content item namespace and what access (e.g., one or more of read access, write access, share access, preview access, download access, etc.) the user(s) and/or group(s) of users have on the content items 231 that belong to the content item namespace. Explicit permissions may come in the form of, for example, one or more access control lists (ACLs) and/or other data associated with the content item namespace (or an identifier thereof) specifying and/or indicating which user(s) and/or group(s) of users have access to the content items 231 in the content item namespace and what access the user(s) and/or group(s) have on the content items 231 in the content item namespace. One example of an implicit permission may be: a user 260 has access to all content items 231 in a content item namespace associated with a user account (or an identifier thereof) of the user 260.

In an exemplary embodiment of the invention, a "default" content item namespace includes content items 231 associated with a user's 260 user account held with the content item management system 210. By successfully authenticating against the user account (e.g., with a valid username/ password), the user 260 implicitly has access to the content items 231 in the default content item namespace associated with the user's 260 user account.

In an exemplary embodiment of the invention, a "shared" content item namespace includes content items 231 belonging to a collection of content items 231 that are shared among multiple user accounts held with the online content management system 210. In some instances, the collection of content items 231 may be referred to as a "shared folder." By successfully authenticating against a user account with which the collection of content items 231 is shared with, the user 260 has access to the content items 231 in the shared content item namespace.

Instead of direct associations between a user's 260 user account and the unique identifiers of the user's 260 hosted content items 231, indirect associations between the user's 260 user account and the user's 260 hosted content items 231 may be established by way of unique identifiers of content item namespaces to which the content items 231 belong. For example, the content item namespace identifier may include a unique 64-bit value that uniquely identifies the content item namespace. However, the content item namespace identifier may be represented with fewer or more bits according to the requirements of the particular implementation at hand. In this case, there may be separate direct associations between content item namespace identifiers and content item identifiers mapping the user's 260 content items 231 to the content item namespaces they belong to. As a simple example, the user's 260 user account may be associated with two content item namespaces with unique identifiers of, for example, ABCD and DEFG. Further, content item namespace ABCD, which may, for example, be a default content item namespace, may be associated with the unique identifiers of one or more content items 231 that belong to the default content item namespace ABCD and content item namespace DEFG, which may, for example, be a shared content item namespace, may be associated with the unique identifiers of one or more content items 231 that belong to the shared content item namespace DEFG. From these associations, once the user 260 is authenticated and the user's 260 user account identified, the unique identifiers of the user's 260 content item namespaces and the user's 260 hosted content item 231 can be identified by the online content management system 210.

Exemplary Operation

Operation of the online content management system 210 in proactively sending hosted content items 231 to user computing devices 250 will now be described by way of an example.

Initially, a hosted content item 231 is accessed by user 260A at user computer 250A. For example, the user 260A may open a local copy of the hosted content item 231 using a word processing application executing at the user computer 250A. As a result, an access event data item $ITEM_1$ may be generated and stored at the user computer 250A. The access event data item $ITEM_1$ may identify, among other information, the hosted content item 231, the path to the hosted content item 231 in a content item folder hierarchy, the user 260A, the user computer 250A, and a date/time the hosted content item 231 was opened. The access event data item $ITEM_1$ may be sent by the user computer 250A over the data network 240 to the access event collector computer 221. Upon receiving the access event data item $ITEM_1$ from the user computer 250A, the access event collector computer

221 may store the access event data item ITEM$_1$ in the access event log 225 as part of collected access event data.

Next, the user 260A may edit the local copy of the hosted content item 231 at the user computer 250A and save the edits to the local copy. As a result, a synchronization application on the user 250A may initiate a content item synchronization operation with the metadata computer 222. As part of the synchronization operation, the metadata computer 222 may consult synchronization log 227 to determine which blocks of the edited local copy of the hosted content item 231 at the user computer 250A the user computer 250A should send to the content item server computer 231 for storage in the storage plane 230. This determination may be based on information provided by the user computer 250A to the metadata computer 222 as part of the synchronization operation. After determining which blocks of the edited local copy of the hosted content item 231 are needed, the metadata computer 222 sends information on which blocks are needed to the user computer 250A. In response to receiving this information, the user computer 250A sends the needed blocks to the content item server computer 232 for storage in the storage plane 230. As a result of the synchronization operation, the storage plane 230 stores a hosted content item 231 that is identical to the edited local copy of the hosted content item 231 at the user computer 250A.

Also as a result of the synchronization operation, another access event data item ITEM$_2$ may be generated and stored in the access event log 225. The access event data item ITEM$_2$ may identify, among other information, the hosted content item 231, the path to the hosted content item 231 in a content item folder hierarchy, the user 260A, the user computer 250A, and a date/time the hosted content item 231 was edited.

Also as a result of the synchronization operation, the edited hosted content item 231 may be sent from the online content management system 210 to the user's 260A other computer 250B as part of a synchronization operation involving the online content management system 210 and the user computer 250B.

Sometime later, the edit hosted content item 231 is accessed by user 260A at user computer 250B. For example, the user 260A may open a local copy of the edited hosted content item 231 using a word processing application executing at the user computer 250B. As a result, an access event data item ITEM$_3$ may be generated and stored at the user computer 250B. The access event data item ITEM$_3$ may identify, among other information, the hosted content item 231, the path to the hosted content item 231 in a content item folder hierarchy, the user 260A, the user computer 250B, and a date/time the hosted content item 231 was opened. The access event data item ITEM$_3$ may be sent by the user computer 250B over the data network 240 to the access event collector computer 221. Upon receiving the access event data item ITEM$_3$ from the user computer 250B, the access event collector computer 221 may store the access event data item ITEM$_3$ in the access event log 225 as part of collected access event data.

Next, the proactive synchronizer 224 may analyze access event data collected in the access event log to determine a cross-device access signal for the hosted content item 231 based on access event data items ITEM$_1$, ITEM$_2$, and ITEM$_3$ that indicates that the hosted content item 231 was accessed at multiple user computing devices (i.e., 250A and 250B). The cross-device access signal may be associated with the identifiers of the user computing devices 250A and 250B at which the hosted content item 231 was accessed and/or associated with the identifiers of the user 260A that accessed the hosted content item 231.

Next, the user 260A may again edit the local copy of the hosted content item 231 at the user computer 250A and save the edits to the local copy. As a result, a synchronization application on the user 250A may again initiate a content item synchronization operation with the metadata computer 222.

Also as a result of the synchronization operation, another access event data item ITEM$_4$ may be generated and stored in the access event log 225. The access event data item ITEM$_4$ may identify, among other information, the hosted content item 231, the path to the hosted content item 231 in a content item folder hierarchy, the user 260A, the user computer 250A, and a date/time the hosted content item 231 was edited.

However, because of selective synchronization, the edited hosted content item 231 may not automatically be sent from the online content management system 210 to the user's 260A other computer 250B.

According to an embodiment of the present invention, because of the existence of access event data item ITEM$_4$ that satisfies the cross-device access signal, the edited hosted content item 231 is sent from the online content management system 210 to the user's 260A other computer 250B as part of a synchronization operation involving the online content management system 210 and the user computer 250B.

To avoid sending the hosted content item 231 to the user computer 250B in the situation where the user computer 250B already stores a local copy of the hosted content item 231, the user computer 250B and the online content management system 210 may implement a synchronization protocol. As part of the synchronization protocol, the user computer 250B maintains a persistent or long-lived network connection to the notification computer 223. The user computer 250B periodically requests for any content item 231 changes over the network connection according to a long-polling mechanism. For example, the user computer 250B may request for changes every sixty seconds and each request may be outstanding for the polling interval (e.g., sixty seconds). On the other hand, when a change to a content item 231 is available, the notification computer 250B may immediately reply to the request identifying one or more content items 231 that have changed. For example, in response to determining that access event data item ITEM$_4$ satisfies the cross-device access signal, the proactive synchronizer computer 223 may signal the notification computer 223 to notify the user computer 250B that the edited hosted content item 231 has been changed. With this, the user computer 250B can determine whether a local copy of the edited hosted content item 231 already exists at the user computer 250B. If it does not, the user computer 250B can retrieve the edited hosted content item 231 from the storage plane 230. In this way, the edited hosted content item 231 is proactively synchronized to the user computer 250B.

Basic Computing Device

The present invention may be implemented on one or more computing devices. Such a computing device may be implemented in various forms including, but not limited to, a client computer, a server computer, a network device, a mobile device, a cell phone, a smart phone, a laptop computer, a desktop computer, a workstation computer, a personal digital assistant, a blade server computer, a mainframe computer, and other types of computing devices.

The computer components described below, including their connections, relationships, and functions, are meant to be exemplary only, and are not meant to limit implementations of the present invention. Other computing devices suitable for implementing the present invention may have different components, including components with different connections, relationships, and functions.

Figure 3:
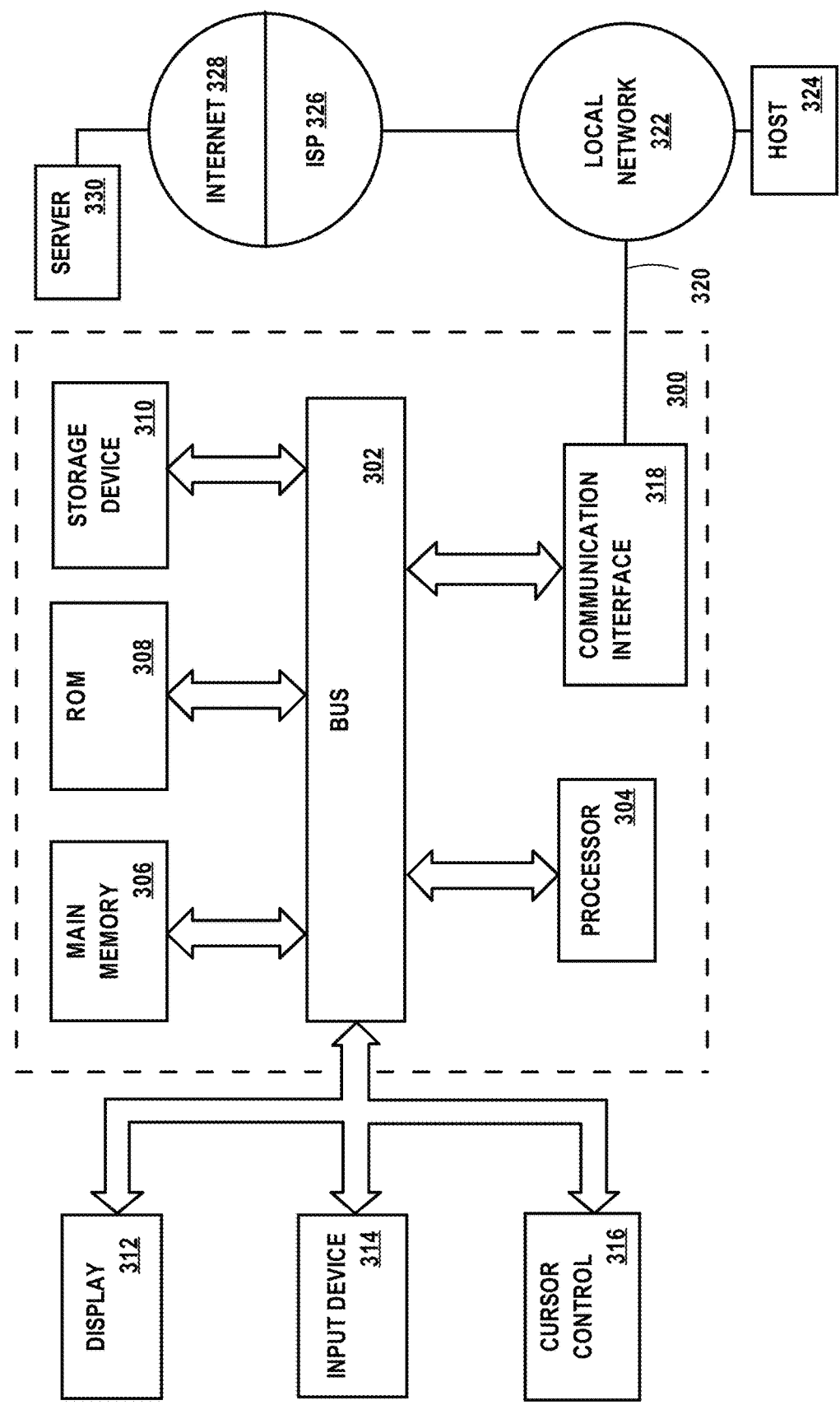
FIG. 3 is a block diagram of a basic computing device in which software-implemented processes of various embodiments of the present invention may be embodied.

Turning now to FIG. 3, it is a block diagram of a basic computing device 300 suitable for implementing various embodiments of the invention. Computing device 300 includes hardware bus 302 or other communication mechanism for addressing main memory 306 and for transferring data between and among the various components of computing device 300. Computing device 300 also includes hardware processor 304 coupled with bus 302 for processing information. Hardware processor 304 may be a general purpose microprocessor, a system on a chip (SoC), or other processor suitable for implementing the described technologies.

Main memory 306, such as a random access memory (RAM) or other dynamic storage device, is coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computing device 300 into a special-purpose computing device that is customized to perform the operations specified in the instructions.

Computing device 300 further includes read only memory (ROM) 308 or other static storage device coupled to bus 302 for storing static information and instructions for processor 304.

Mass storage device 310 is coupled to bus 302 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, mass storage devices 310 (e.g., the main hard disk for the device) stores a body of program and data for directing operation of the computing device, including an operating system, user application programs, driver and other support files, as well as other data files of all sorts.

Computing device 300 may be coupled via bus 302 to display 312, such as a liquid crystal display (LCD) or other electronic visual display, for displaying information to a computing device user. Display 312 may also be a touch-sensitive display for communicating touch gesture (e.g., finger or stylus) input to processor 304.

An input device 314, including alphanumeric and other keys, is coupled to bus 302 for communicating information and command selections to processor 304.

Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computing device 300 may implement the methods described herein using customized hard-wired logic, one or more application-specific integrated circuits (ASICs), one or more field-programmable gate arrays (FPGAs), firmware, or program logic which, in combination with the computing device, causes or programs computing device 300 to be a special-purpose machine.

Methods disclosed herein may also be performed by computing device 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computing device. The remote computing device can load the instructions into its dynamic memory and send the instructions over a telephone line using a modem. A modem local to computing device 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computing device 300 also includes communication interface 318 coupled to bus 302. Communication interface 318 provides a two-way data communication coupling to wired or wireless network link 320 that is connected to local network 322 (e.g., Ethernet network, Wireless Local Area Network, cellular phone network, Bluetooth wireless network, or the like). Communication interface 318 sends and receives electrical, electromagnetic, or optical signals that carry digital data streams representing various types of information. For example, communication interface 318 may be a wired network interface card, a wireless network interface card with an integrated radio antenna, or a modem (e.g., ISDN, DSL, or cable modem).

Network link 320 typically provide data communication through one or more networks to other data devices. For example, network link 320 may provide a connection through local network 322 to host computing device 324 or to data equipment operated by Internet Service Provider (ISP) 326. ISP 326 in turn provides data communication services through the world wide packet data communication network now commonly referred to as the "Internet" 328. Local network 322 and Internet 328 use electrical, electromagnetic or optical signals that carry digital data streams. The signals through the various networks and the signals on network link 320 and through communication interface 318, which carry the digital data to and from computing device 300, are example forms of transmission media.

Computing device 300 can send messages and receive data, including program code, through local network 322, Internet 328, ISP 326, network link 320 and communication interface(s) 318. In the Internet example, server computing device 330 might transmit a requested code for an application program through Internet 328, ISP 326, local network 322 and communication interface 318.

The received code may be executed by processor 304 as it is received, and/or stored in storage device 310, or other non-volatile storage for later execution.

Basic Software System

Figure 4:
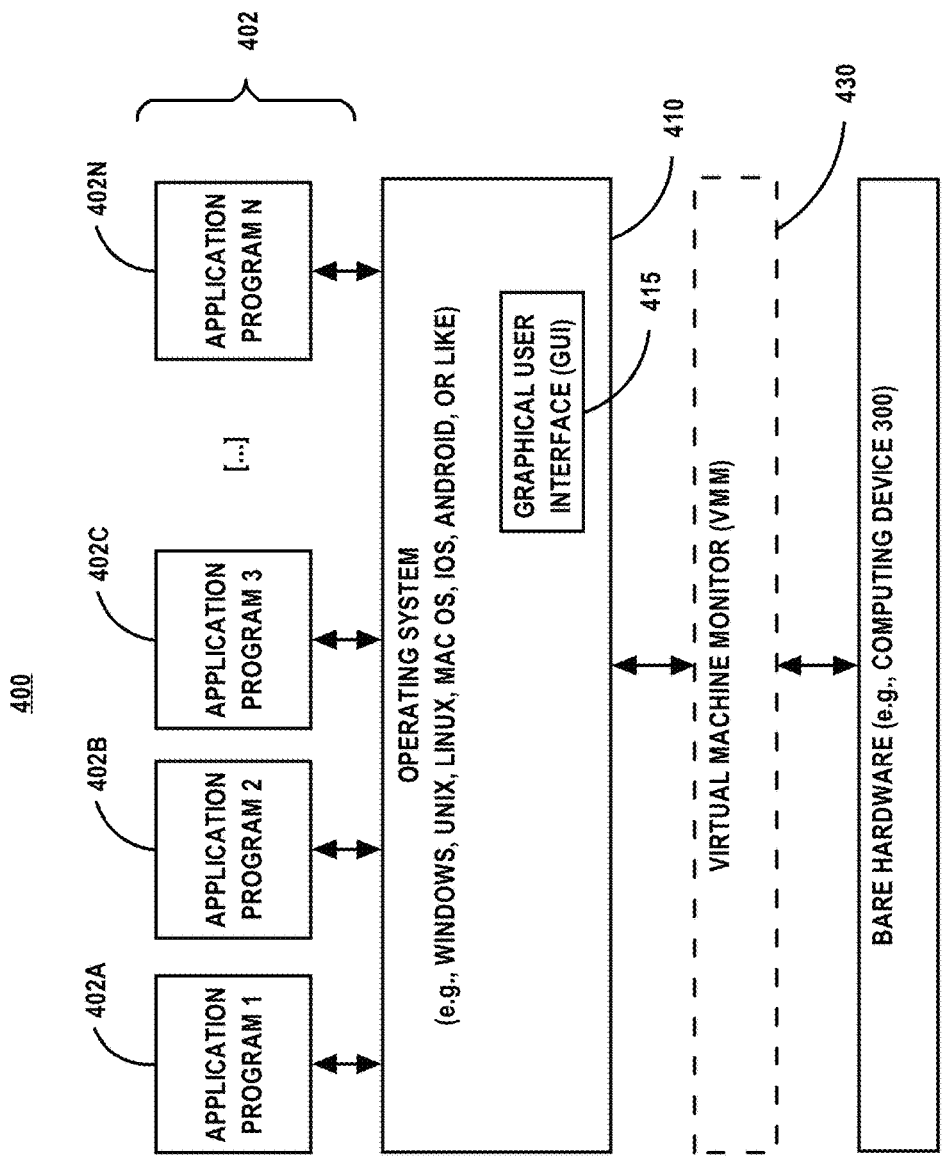
FIG. 4 is a high-level diagram of a basic software system that may be used for controlling the operation of the basic computing device of FIG. 3.

Turning now to FIG. 4, it is a block diagram of a basic software system 400 for controlling the operation of computing device 300 in accordance with some embodiments of the invention. As shown, computer software system 400 is provided for directing the operation of computing device 300. Software system 400, which is stored in system memory (RAM) 306 and on fixed storage (e.g., hard disk) 310, includes kernel or operating system (OS) 410. OS 410 manages low-level aspects of computing device operation, including managing execution of processes, memory allocation, file input and output (I/O), and device I/O. One or more application programs 402 (e.g., 402A, 402B, 402C . . . 402N) may be "loaded" (e.g., transferred from fixed storage 310 into memory 306) for execution by system 400. In some instances, application programs 402 or other software intended for use on device 300 may also be stored as a set of downloadable computer-executable instructions, for example, for downloading and installation from an Internet location (e.g., from a web server).

Software system 400 may include graphical user interface (GUI) 415, for receiving user commands and data in a graphical (e.g., "point-and-click" or "touch gesture") fashion. These inputs, in turn, may be acted upon by system 400 in accordance with instructions from operating system 410 and/or application programs 402. GUI 415 also serves to display the results of operation from OS 410 and application programs 402, whereupon the user may supply additional inputs or terminate the session (e.g., log off).

OS 410 can execute directly on the hardware (e.g., processor 304) of computing device 300. Alternatively, hypervisor or virtual machine monitor (VMM) 430 may be interposed between the hardware and OS 410. In this configuration, VMM 430 acts as a software "cushion" or virtualization layer between OS 410 and the hardware of computing device 300.

VMM 430, if present, instantiates and runs virtual machine instances ("guest machines"). Each guest machine includes a "guest" operating system, such as OS 410, and one or more application programs, such as application programs 402, designed to execute on the guest operating system. VMM 430 presents the guest operating systems with a virtual operating platform and manages the execution of the guest operating systems. In some instances, VMM 430 may allow a guest operating system to run as through it is running on the hardware of computing device 300 directly. In these instances, the same version of the guest operating system configured to execute on the hardware directly may also be able to execute on VMM 430 without modification or reconfiguration. In other words, VMM 430 may provide full hardware and CPU virtualization to a guest operating system in some instances. In other instances, a guest operating system may be specially designed or configured to execute on VMM 430 for efficiency. In these instances, the guest operating system is "aware" that it executes on a virtual machine monitor 430. In other words, VMM 430 may provide para-virtualization to a guest operating system in some instances.

The above-described basic computer hardware and software are presented for purpose of illustrating basic underlying computer components that may be employed for implementing various embodiments of the present invention. The present invention, however, is not limited to any particular computing environment or computer configuration. Instead, an embodiment of the present invention may be implemented in any type of system architecture or processing environment capable of supporting the embodiment as disclosed herein.

Extensions and Alternatives

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. For example, techniques described herein as being performed by different computing devices in certain implementations may in other implementations be performed by the same computing device. Conversely, various features described in the context of a single implementation can also be implemented in multiple implementations separately or in any suitable sub-combination. For example, techniques described herein is being performed by a single computing device in certain implementations may in other implementations be performed by multiple computing devices configured in a clustered or distributed computing arrangement. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for proactively sending a hosted content item to a user computing device, the method performed by a computing system comprising one or more processors and memory, the method comprising:
   collecting access event data representing a plurality of access events pertaining to a plurality of content items hosted with an online content management service;
   wherein the access event data indicates that:
      a first access event of the plurality of access events pertains to a first content item of the plurality of content items,
      a second access event of the plurality of access events pertains to the first content item of the plurality of content items,
      the first access event occurs at a first user computing device of a particular user,
      the second access event occurs at a second user computing device of the particular user, and
      the first user computing device and the second user computing device are different user computing devices;
   determining, based on the access event data, a cross-device access signal;
   wherein the determining the cross-device access signal is based on the access event data indicating that:
      the first access event of the plurality of access events pertains to the first content item of the plurality of content items,
      the second access event of the plurality of access events pertains to the first content item of the plurality of content items,
      the first access event occurs at the first user computing device of the particular user,
      the second access event occurs at the second user computing device of the particular user, and
      the first user computing device and the second user computing device are different user computing devices;
   wherein the cross-device access signal indicates:
      the particular user,
      the first content item,
      the first user computing device, and
      the second user computing device;
   collecting additional access event data representing a third access event pertaining to the first content item;
   wherein the additional access event data indicates that the third access event occurs at the first user computing device;
   determining, based on the additional access event data, that the third access event satisfies the cross-device access signal; and
   based on the third access event satisfying the cross-device access signal, sending the first content item to the second user computing device.

2. The method of claim 1, wherein the determining the cross-device access signal is based, at least in part, on identifying in the access event data, a plurality of access event data items having a same content item identifier but with different user computing device identifiers.

3. The method of claim 1, wherein the determining that the third access event satisfies the cross-device access signal is based, at least in part, on comparing a content item identifier of the first content item to a content item identifier indicated by the cross-device access signal.

4. The method of claim 1, wherein the sending the first content item to the second user computing device is based, at least in part, on:
   notifying the second user computing device that the first content item is available; and
   sending the first content item to the second user computing device in response to the second user computing device requesting the first content item.

5. The method of claim 1, wherein the third access event comprises at least one of:
   opening the first content item at the first user computing device;
   downloading the first content item to the first user computing device;
   presenting the first content item in a web browser graphical user interface at the first user computing device; or
   sharing the first content item from the first user computing device.

6. The method of claim 1, wherein the collecting the access event data is based, at least in part, on generating and storing access event data items in response to detecting the plurality of access events.

7. A computing system for proactively sending a hosted content item to a user computing device, the computing system comprising:
   one or more hardware processors;
   storage media; and
   one or more computer programs stored in the storage media and configured for execution by the one or more hardware processors, the one or more computer programs comprising instructions configured to perform operations including:
   collecting access event data representing a plurality of access events pertaining to a plurality of content items hosted with an online content management service;
   wherein the access event data indicates that:
      a first access event of the plurality of access events pertains to a first content item of the plurality of content items,
      a second access event of the plurality of access events pertains to the first content item of the plurality of content items,
      the first access event occurs at a first user computing device of a particular user,
      the second access event occurs at a second user computing device of the particular user, and
      the first user computing device and the second user computing device are different user computing devices;
   determining based on the access event data, a cross-device access signal;
   wherein the determining the cross-device access signal is based on the access event data indicating that:
      the first access event of the plurality of access events pertains to the first content item of the plurality of content items,
      the second access event of the plurality of access events pertains to the first content item of the plurality of content items, the first access event occurs at the first user computing device of the particular user, the second access event occurs at the second user computing device of the particular user, and the first user computing device and the second user computing device are different user computing devices;

wherein the cross-device access signal indicates:
the particular user,
the first content item,
the first user computing device, and
the second user computing device;

collecting additional access event data representing a third access event pertaining to a second content item hosted with the online content management service;

wherein the additional access event data indicates that the third access event occurs at the first user computing device;

wherein the first content item is a content item folder;

determining that the second content item is contained in the content item folder;

determining, based on the additional access event data and the determining that the second content item is contained in the content item folder, that the third access event satisfies the cross-device access signal; and based on the third access event satisfying the cross-device access signal, sending the second content item, of the plurality of content items, to the second user computing device.

8. The computing system of claim 7, wherein the determining the cross-device access signal is based, at least in part, on identifying a plurality of access event data items in the access event data having a common content item folder hierarchy path prefix, different content item identifiers, and different user computing device identifiers.

9. The computing system of claim 7, wherein the determining that the third access event satisfies the cross-device access signal is based, at least in part, on comparing (a) a path in a content item folder hierarchy to a folder that contains the second content item to (b) a path in the content item folder hierarchy to a folder associated with the cross-device access signal.

10. The computing system of claim 7, wherein the sending the second content item to the second user computing device is based, at least in part, on:

notifying the second user computing device that the second content item is available; and sending the second content item to the second user computing device in response to the second user computing device requesting the second content item.

11. The computing system of claim 7, wherein the third access event comprises at least one of:

opening the second content item at the first user computing device;

downloading the second content item to the first user computing device;

presenting the second content item in a web browser graphical user interface at the first user computing device;

or sharing the second content item from the first user computing device.

12. The computing system of claim 7, wherein the collecting the access event data is based, at least in part, on generating and storing access event data items in response to detecting the plurality of access events.

13. The method of claim 1, wherein:

the first access event pertains to presenting at least a portion of the first content item in a graphical user interface at the first user computing device, and the second access event pertains to presenting at least a portion of the first content item in a graphical user interface at the second user computing device.

14. The computing system of claim 7, wherein:

the first access event pertains to opening the content item folder at the first user computing device, and the second access event pertains to opening the content item folder at the first user computing device.

15. The method of claim 1, wherein the sending the first content item to the second user computing device is based, at least in part, on sending a plurality of data blocks of the first content item to the second user computing device.

16. The computing system of claim 7, wherein:

the first access event pertains to accessing a content item contained in the content item folder at the first user computing device, and the second access event pertains to accessing a content item contained in the content item folder at the second user computing device.

* * * * *